United States Patent
Romeo

(10) Patent No.: US 7,526,073 B2
(45) Date of Patent: Apr. 28, 2009

(54) IVR TO SMS TEXT MESSENGER

(75) Inventor: John Patrick Romeo, Round Rock, TX (US)

(73) Assignee: AT&T Intellectual Property L.L.P., Reno, NV (US)

( * ) Notice: Subject to any disclaimer, the term of this patent is extended or adjusted under 35 U.S.C. 154(b) by 712 days.

(21) Appl. No.: 11/173,883

(22) Filed: Jul. 1, 2005

(65) Prior Publication Data

US 2007/0025529 A1     Feb. 1, 2007

(51) Int. Cl.
*H04M 11/06* (2006.01)

(52) U.S. Cl. ............ 379/88.18; 370/466; 379/88.14; 379/208.01; 455/466; 704/254

(58) Field of Classification Search ............ 379/88.14, 379/88.18, 208.01; 455/466, 550.1, 566; 370/466; 704/254

See application file for complete search history.

(56) References Cited

U.S. PATENT DOCUMENTS

| | | | | |
|---|---|---|---|---|
| 6,151,507 A | * | 11/2000 | Laiho et al. | 455/466 |
| 6,574,486 B1 | * | 6/2003 | Labban | 455/550.1 |
| 7,127,264 B2 | * | 10/2006 | Hronek et al. | 455/466 |
| 7,164,936 B2 | * | 1/2007 | Heatley | 455/566 |
| 7,200,413 B2 | * | 4/2007 | Montemer et al. | 455/466 |
| 2002/0119793 A1 | * | 8/2002 | Hronek et al. | 455/466 |

* cited by examiner

Primary Examiner—Gerald Gauthier
(74) *Attorney, Agent, or Firm*—Toler Law Group

(57) ABSTRACT

Wireless service providers use SMS to notify users of text messages from other wireless users using text-based communications. SMS is used in conjunction with an Interactive Voice Response system and a text-to-speech (TTS) translator to provide enhanced text messaging. Users access the SMS menu on their wireless phone. Instead of typing a text message on the wireless phone keypad, users select an IVR option that connects to the wireless service provider's IVR system. After entering or speaking the telephone number (name or nickname) for the "To:" field, the user speaks the message to be sent via SMS. The IVR reads back the spoken message for user confirmation. Once confirmed, the message is translated to text using a Text-to-Speech translator, or a speech recognition dictation feature, and forwarded to the SMS Messaging Gateway. Alternative embodiments are adapted for use with traditional wireline phones, so that the caller calls the wireless service provider's IVR system, enters the destination number and speaks the message to be sent. Further embodiments provide for the recipient of the message to optionally have the text message spoken via a TTS feature.

20 Claims, 1 Drawing Sheet

IVR TO SMS TEXT MESSENGER

FIELD OF THE INVENTION

The present invention relates to telecommunications, and in particular to an enhanced text messenger in a telecommunications network.

BACKGROUND OF THE INVENTION

Short Message Service (SMS) is a popular wireless telephone feature with which a subscriber enters a short text message with their cell phone keypad and sends the message to a recipient after entering the telephone number of the recipient. The recipient is alerted to the incoming message and the text message is displayed on the display screen of the recipient's phone.

In certain circumstances, however, such as while driving, keying a text message into the phone is difficult or outright dangerous. Additionally, visually impaired persons may find it difficult to visually confirm that they entered a message in correctly. It would be useful, therefore, to have a text messenger solution that allowed a user to create and send a text message by speaking into the phone. The present invention provides such a solution.

U.S. Pat. No. 5,950,123 issued Sep. 7, 1999 to Schwelb et al., and entitled CELLULAR TELEPHONE NETWORK SUPPORT OF AUDIBLE INFORMATION DELIVERY TO VISUALLY IMPAIRED SUBSCRIBERS, describes a text-to-speech delivery system for text messages to a visually impaired recipient, but does not describe an IVR-based and speech-to-text message creation solution of the present invention.

Published European patent application no. 1185068 A2, published Mar. 6, 2002, by Uri Lewin, et al., and entitled METHOD AND APPARATUS FOR VOICE MESSAGING ORIGINATED BY MOBILE TERMINALS, discloses methods and systems for voice mail messages and transferring voice messages among wireless subscribers of different networks, a process the disclosure refers to Voice SMS, but does not provide a text message solution of the present invention.

BRIEF DESCRIPTION OF THE DRAWINGS

The present invention is further described in the detailed description that follows, by reference to the noted drawings, by way of non-limiting examples of embodiments of the present invention, in which reference numerals represent the same parts throughout the several views of the drawings, and in which.

DETAILED DESCRIPTION OF THE INVENTION

Figure 1:
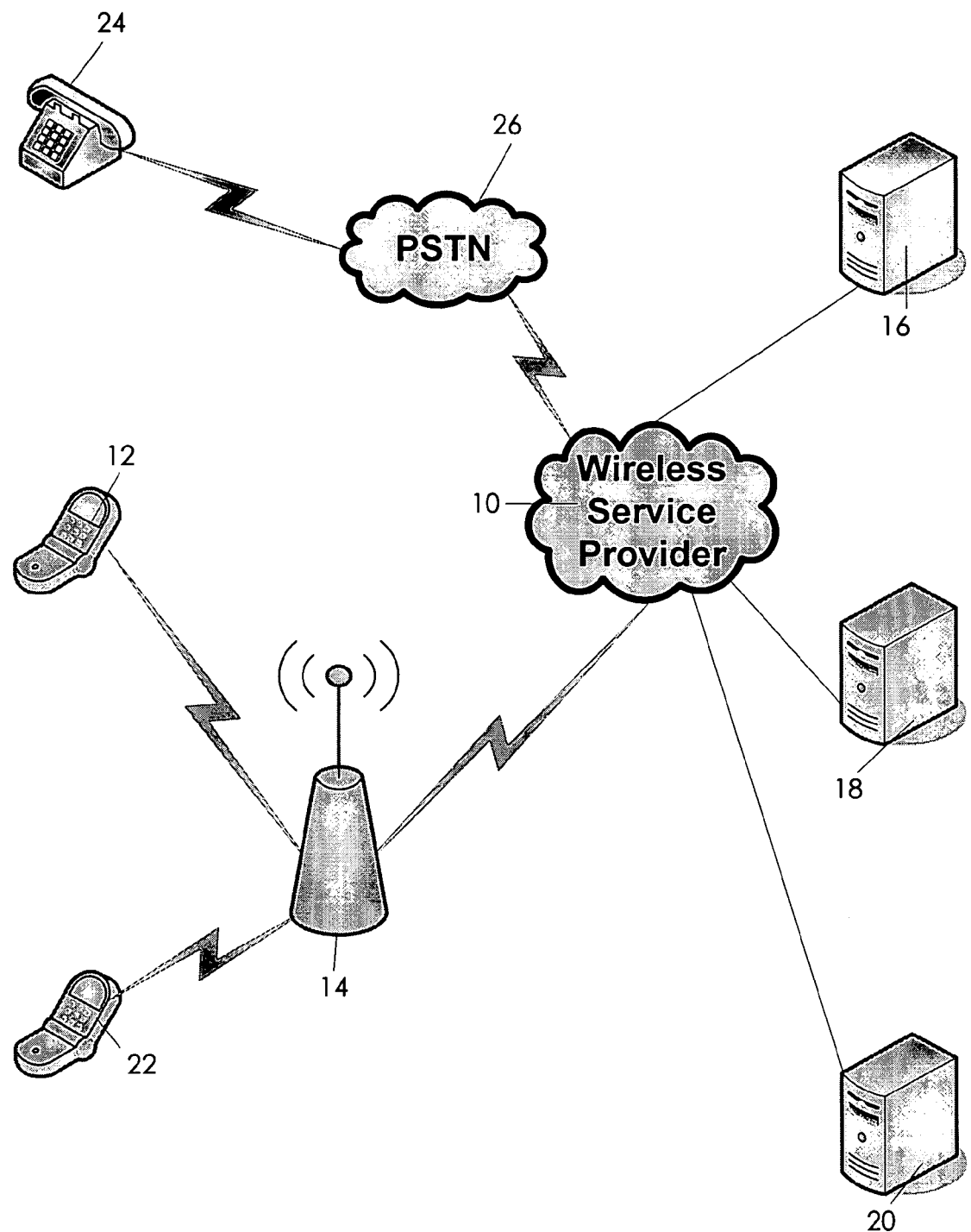
FIG. 1 is schematic drawing of a specific exemplary embodiment of an IVR SMS messenger system of the present invention.

In view of the foregoing, the present invention, through one or more of its various aspects, embodiments and/or specific features or sub-components, is thus intended to bring out one or more of the advantages that will be evident from the description. The present invention is described with frequent reference to interactive voice response (IVR). It is understood, however, that IVR is merely an example of a specific embodiment of the present invention, which is directed broadly to converting speech to text within the scope of the invention. The terminology, examples, drawings and embodiments, therefore, are not intended to limit the scope of the invention.

Short message service (SMS) is a service available on most digital mobile phones. The service permits the sending of short messages (also known as SMSes, text messages, messages, or more colloquially texts or even txts) between mobile phones, other handheld devices and even landline telephones. The first SMS is believed to have been sent in December 1992 by Neil Papworth of Sema Group from a personal computer (PC) to a mobile phone on the Vodafone GSM network in the United Kingdom.

Short message service is a globally accepted wireless service that enables the transmission of alphanumeric messages between mobile subscribers and external systems such as electronic mail, paging, and voice-mail systems. SMS was originally designed as part of the Global System for Mobile Communications (GSM) digital mobile phone standard, but is now available on a wide range of networks, including 3G networks.

The service makes use of a short messaging service center (SMSC), which acts as a store-and-forward system for short messages. The wireless network provides the mechanisms required to find the destination station(s) and transports short messages between the SMSCs and wireless stations. In contrast to other existing text-message transmission services such as alphanumeric paging, the service elements are designed to provide guaranteed delivery of text messages to the destination. Additionally, SMS supports several input mechanisms that allow interconnection with different message sources and destinations.

SMS is characterized by out-of-band packet delivery and low-bandwidth message transfer to provide a highly efficient means for transmitting short bursts of data. A distinguishing characteristic of SMS is that an active mobile handset is able to receive or submit a short message at any time, independent of whether a voice or data call is in progress (in some implementations, this may depend on the mobile switching center (MSC) or SMSC capabilities). SMS also guarantees delivery of the short message by the network. Temporary failures due to unavailable receiving stations are identified, and the short message is stored in the SMSC until the destination device becomes available.

Initial applications of SMS focused on obsolescing alphanumeric pagers by permitting two-way general-purpose messaging and notification services, primarily for voice mail. As technology and networks evolved, a variety of services have been introduced, including e-mail, fax, and paging integration, interactive banking, information services such as stock quotes, and integration with Internet-based applications.

Wireless data applications include downloading subscriber identity module (SIM) cards for activation, debit, profile-editing purposes, wireless points of sale (POSs), and other field-service applications such as automatic meter reading, remote sensing, and location-based services. Additionally, integration with the Internet spurred the development of Web-based messaging and other interactive applications such as instant messaging, gaming, and chatting.

interactive voice response, or IVR, is a computerized system that allows a person, typically a telephone caller, to select an option from a voice menu and otherwise interface with a computer system by voice. Generally the system plays pre-recorded voice prompts to which the person presses a number on a telephone keypad to select the option chosen, or speaks simple answers such as "yes", "no", or numbers in answer to the voice prompts. The latest systems use natural language speech recognition to interpret the questions that the person wants answered or to process the spoken responses.

Recent innovations include the ability to speak complex and dynamic information such as an e-mail, news report or weather information using Text-To-Speech (TTS). TTS is computer generated synthesized speech and is no longer the robotic voice people associate with computers. Real voices are used to create the speech in tiny fragments that are automatically spliced together before being played to the caller.

IVR systems are used to create and manage many services, including, for example, telephone banking, purchase order placement, caller identification and routing, balance inquiry, and airline ticket booking. Voicemail systems are different from IVR systems in that they are a one-way communication tool (the caller leaves a message), whereas IVR systems attempt two-way interaction with the caller. ACD systems are often the first point of contact when calling many larger businesses, and can be used in place of more expensive IVR systems. IVR systems are generally used at the front end of call centers to identify what service the caller wants and to extract numeric information such as account numbers as well as provide answers to simple questions such as account balances or allow pre-recorded information to be heard.

IVR call flows are created in a variety of ways. Older systems depended upon proprietary programming or scripting languages. More recent systems are structured similar to WWW pages, using the VoiceXML or SALT (http://www.saltforum.org/speechtek05/) language. This allows any Web server to act as an application server, freeing the developer to focus on the call flow. IVR system development no longer requires specialized programming skills. Virtually any Web developer already has all the tools needed to create an IVR call flow.

Speech recognition technologies allow computers equipped with a source of sound input, such as a microphone, to interpret human speech, e.g. for transcription or as an alternative method of interacting with a computer. Speech recognition technology is increasingly used for telephone applications. Typical telephone applications include travel booking and information, financial account information, customer service call routing, and directory assistance.

Using constrained grammar recognition, such applications can achieve remarkably high accuracy. Research and development in speech recognition technology continues to grow as the cost for implementing such voice-activated systems has dropped and the usefulness and efficacy of the systems has improved. For example, recognition systems optimized for telephone applications often supply information about the confidence of a particular recognition, and if the confidence is low, it can trigger the application to prompt callers to confirm or repeat their request (for example "I heard you say 'billing', is that right?").

Furthermore, speech recognition enables the automation of certain applications. For example, directory assistance and other systems now allow callers to "dial" by speaking names listed in an electronic phone book. Nevertheless, push-button systems are still much les expensive to implement and operate.

Speech recognition systems can be classified as to whether:

(1) they require the user to "train" the system to recognize their own particular speech patterns or not;
(2) the system is trained for one user only or is speaker independent;
(3) the system can recognize continuous speech or requires users to break up their speech into discrete words;
(4) the system is intended for clear speech material, or is designed to operate on distorted transfer channels (e.g., cellular phones) and possibly background noise or another speaker talking simultaneously; and
(5) the vocabulary the system recognizes is small (in the order of tens or at most hundreds of words), or large (thousands of words).

An important application of speech recognition is dictation, which transcribes the spoken words to text. There are many commercially available speech recognition dictation solutions available and which may be found by searching with selected key words on any well known search engine.

FIG. 1 is schematic drawing of a specific exemplary embodiment of an IVR SMS messenger system of the present invention. Wireless service provider 10 provides telecom services to the subscriber of wireless terminal 12 via wireless service tower 14. The subscriber accesses SMS messaging gateway 16, which provides an IVR option 18 that may be selected by the subscriber through, for example, a menu display on terminal 12. Alternative embodiments provide an audio menu in which selections may be made by speaking or pressing a terminal button in response to a prompt. With the IVR activated, the subscriber responds to IVR prompts which include, for example, indicating the destination of the message and a prompt to speak a message into the terminal.

In various embodiments of the invention, the destination may be indicated by one or more designation, such by the phone number of the destination or by the name, or nickname, of a user of the destination terminal. The message is brief enough to be accommodated by the SMS system. Specific embodiments provide a confirmation feature in which the IVR speaks back the message for confirmation by the subscriber, allows the subscriber to make any desired corrections, and finalizes the message content.

The spoken message, input through IVR 18, is converted to text by translator 20. A command to send or transmit the message initiates a communication protocol so that the message is sent through network 10 and tower 14 to terminal 22 for receipt by a user of terminal 22. Various embodiments provide scheduling features so that the message may be sent on a delayed basis at a specified time or after a selected period of time after confirmation or translation of the message. Communication protocols for the invention include Internet Protocol, GSM, and others.

Further embodiments provide TTS capabilities for the message recipient, at terminal 22, so that the recipient of the message may elect to have the message spoken by terminal 22 rather than, or in addition to, reading the message in text form. Such embodiments may be programmed to read a message in the present invention automatically or, alternatively, upon manual selection of the option. Such features may be useful in a circumstance, for example, when the message recipient is driving or is otherwise indisposed to read the message when it arrives at terminal 22.

Alternative embodiments are adapted for use with traditional wireline phones 24, so that the caller calls the wireless service provider's IVR system via traditional public switched telephone network (PSTN) 26, enters the destination number and speaks the message to be sent. The sent message is transmitted through PSTN 26 to wireless network 10 to ultimately be received by terminal 22.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. The invention is considered to include a tangible storage medium or distribution medium, as listed herein and including art-recognized equivalents and successor media, in which the software implementations herein are stored.

Accordingly, those skilled in the art will recognize that the present invention extends to computer readable media ("CRM") contain instructions for execution by a computer. CRM is broadly defined to include any kind of computer memory such as floppy disks, conventional hard disks, CD-ROMs, Flash ROMS, nonvolatile ROM, RAM, Storage Media, email attachments, solid state media, magnetic media, and signals containing instructions, together with processors to execute the instructions.

The invention has been described with reference to several exemplary embodiments. It is understood, however, that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

I claim:

1. A computer-readable medium having instructions stored thereon that, when executed by a computer, cause the computer to:
    open a short message service (SMS) menu selected by a user of a first telecommunications terminal;
    activate an interactive voice response (IVR) option selected from the SMS menu, wherein an IVR system prompts the user to supply spoken input, the spoken input comprising a spoken message;
    translate the spoken message to a text message; and
    transmit the text message to a second telecommunications terminal over a telecommunications network.

2. The computer-readable medium of claim 1, further comprising instructions that, when executed by the computer, cause the computer to speak, by the IVR system, the text message for the user to confirm content of the text message prior to transmission.

3. The computer-readable medium of claim 1, wherein the network comprises a wireless network.

4. The computer-readable medium of claim 1, wherein the network comprises a public switched telephone network (PSTN).

5. The computer-readable medium of claim 1, wherein the network comprises a wireline network.

6. The computer-readable medium of claim 1, further comprising instructions that, when executed by the computer, cause the computer to activate a text-to-speech translator selected by a user of the second telecommunications terminal wherein the text-to-speech translator speaks the text message to the user of the second telecommunications terminal.

7. The computer-readable medium of claim 1, wherein the input comprises a telephone number of the second terminal.

8. The computer-readable medium of claim 1, wherein the input comprises a name of a subscriber of the second terminal.

9. The computer-readable medium of claim 1, wherein at least one of the terminals is a cell phone.

10. The computer-readable medium of claim 1, wherein the first telecommunications terminal is a wireline telephone and the second telecommunications terminal is a wireless terminal.

11. The computer-readable medium of claim 1, further comprising instructions that, when executed by the computer, cause the computer to connect the first telecommunications terminal to the IVR system in response to the user selecting the IVR option.

12. The computer-readable medium of claim 11, wherein the prompts include a first prompt indicating a destination of the text message and a second prompt to speak the spoken message into the first telecommunications terminal.

13. The computer-readable medium of claim 1, further comprising instructions that, when executed by the computer, cause the computer to forward the text message to a SMS messaging gateway.

14. The computer-readable medium of claim 1, further comprising instructions that, when executed by the computer, cause the computer to speak the text message in response to selection of a text-to-speech feature by a user of the second telecommunications terminal.

15. The computer-readable medium of claim 1, further comprising instructions that, when executed by the computer, cause the computer to send the text message in response to a selected scheduling feature.

16. The computer-readable medium of claim 15, wherein the selected scheduling feature is selected from a plurality of scheduling features.

17. The computer-readable medium of claim 1, wherein the SMS menu is a displayed menu or an audio menu.

18. A method comprising:
    opening a short message service (SMS) menu selected by a user of a first telecommunications terminal;
    activating an interactive voice response (IVR) option selected from the SMS menu by the user, wherein an IVR system prompts the user to supply spoken input, the spoken input comprising a spoken message;
    translating the spoken message to a text message; and
    transmitting the text message to a second telecommunications terminal over a telecommunications network.

19. A system comprising:
    a short message service (SMS) messaging gateway accessible to a first telecommunications terminal;
    an interactive voice response (IVR) system to prompt for spoken input in response to activation of an IVR option selectable from a SMS menu associated with the first telecommunications terminal;
    a translator to translate speech to a text message from the spoken input; and
    a wireless network connecting the first telecommunications terminal to a second telecommunications terminal.

20. The system of claim 19, further comprising a public switched telephone network (PSTN) and wherein the first telecommunications terminal is a wireline terminal.

* * * * *